US006996195B2

(12) United States Patent
Kadous

(10) Patent No.: US 6,996,195 B2
(45) Date of Patent: Feb. 7, 2006

(54) CHANNEL ESTIMATION IN A COMMUNICATION SYSTEM

(75) Inventor: Tamer Kadous, Madison, WI (US)

(73) Assignee: Nokia Mobile Phones Ltd., Espoo (FI)

( * ) Notice: Subject to any disclaimer, the term of this patent is extended or adjusted under 35 U.S.C. 154(b) by 904 days.

(21) Appl. No.: 09/746,376

(22) Filed: Dec. 21, 2000

(65) Prior Publication Data

US 2001/0036235 A1 Nov. 1, 2001

Related U.S. Application Data

(60) Provisional application No. 60/171,470, filed on Dec. 22, 1999.

(51) Int. Cl.
*H03D 1/00* (2006.01)
*H03K 9/00* (2006.01)

(52) U.S. Cl. ........................ 375/341; 375/316; 375/340

(58) Field of Classification Search ......... 375/329–340, 375/144–148, 341, 316, 210, 260, 299; 370/428, 370/335

See application file for complete search history.

(56) References Cited

U.S. PATENT DOCUMENTS 6,452,981 B1 * 9/2002 Raleigh et al. ............. 375/299
6,621,808 B1 * 9/2003 Sadri .......................... 370/335
6,654,429 B1 * 11/2003 Li ............................. 375/316

OTHER PUBLICATIONS

Robust channel estimation for OFDM systems with rapid dispersive fading channelsLi, Y.; Cimini, L.J., Jr.; Sollenberger, N.R.; Communications, IEEE Transactions on , vol.: 46 , Issue: 7, Jul. 1998, pp. 902–915.*

Channel estimation for OFDM systems with transmitter diversity in mobile wireless channelsYe Li; Seshadri, N.; Ariyavisitakul, S.; Selected Areas in Communications, IEEE Journal on , vol.: 17 , Issue: 3 , Mar. 1999, pp.: 461–471.*

(Continued)

*Primary Examiner*—Stephen Chin
*Assistant Examiner*—Cicely Ware
(74) *Attorney, Agent, or Firm*—Allen S. Lineberry; Robert H. Kelly; Steven A. Shaw

(57) ABSTRACT

A method and apparatus for estimating channels in orthogonal frequency division multiplexed (OFDM) communication systems. The method and apparatus allows a channel estimate to be determined independent of having knowledge on channel statistics. Channel estimation is performed by determining and then utilizing a least square (LS) estimate and an interpolation coefficient for each antenna transmitting to the receiver. The interpolation coefficient is determined independently from the statistics of the channel, i.e., without needing the channel multipath power profile (CMPP). The interpolator coefficient is multiplyed by an LS estimate for each transmitting antenna to determine the channel estimate for each channel.

14 Claims, 2 Drawing Sheets

OTHER PUBLICATIONS

OFDM channel estimation by singular value decomposition;Edfors, O. et al. ; Vehicular Technology Conference, 1996. 'Mobile Technology for the Human Race'., IEEE 46th, vol.: 2 , Apr. 28–May 1, 1996, pp.: 923–927 vol. 2.*

Robust channel estimation for OFDM systems with rapid dispersive fading channelsLi, Y.; Cimini, L.J., Jr.; Sollenberger, N.R.; □□Communications, IEEE Transactions on, vol.: 46 , Issue; 7 , Jul. 1998, pp.: 902–915.*

OFDM channel estimation by singular value decomposition;Edfors, O. et al. ; Vehicular Technology Conference, 1996. 'Mobile Technology for Human Race'., IEEE 46th , vol.: 2, Apr. 28–May 1, 1996, pp.: 923–927 vol. 2.*

J.J. Vande Beek, O. Edfors, M. Sandelli, S. K. Wilson, and P. O. Borjeson, "On Channel Estimation in OFDM systems," in proc. 45th IEEE on Vehicular Technology Conference, IL, Jul. 1995, pp. 815–819.

J.J. Vande Beek, O. Edfors, M. Sandelli, S. K. Wilson, and P. O. Borjeson, "OFDM Channel Estimation with Singular Value Decomposition," in proc. 46th IEEE on Vehicular Technology Conference, Atlanta, GA, Apr. 1996, pp. 923–927.

Y. Lli, L. J. Cimini, JRr. and N. R. Sollenberger, "Robust Channel Estimation for OFDM Systems with Rapid Dispersive Fading Channels," IEEE Trans. On Communications, vol. 46, No. 7 , Jul. 1998.

Y. Li, N. Seshadri and S. Ariyavisitakul, "Channel Estimation for OFDM Systems with Transmitter Diversity in Mobile Wireless Channels," IEEE JSAC, vol. 17, No. 3, Mar. 1999.

S. K. Wilson, R. E. Khayata and J. M. Cioffi, "16 QAM Modulation with Orthogonal Frequency Division Multiplexing in a Rayleigh–Fading Environment," in proc. VTC–1994, pp. 1660–1664, Stockholm, Sweden, Jun. 1994.

* cited by examiner

CHANNEL ESTIMATION IN A COMMUNICATION SYSTEM

This application claims the benefit of U.S. Provisional Application No. 60/171,470, filed Dec. 22, 1999.

FIELD OF THE INVENTION

The present invention relates generally to methods and apparatus for estimating a channel susceptible to distortion in a communication system. More particularly, the present invention relates to an apparatus and an associated method, for estimating channels in orthogonal frequency division multiplexed (OFDM) communication systems.

BACKGROUND OF THE INVENTION

Digital communication techniques have been developed and implemented in communication systems, including communication systems utilizing radio channels. Digital communication techniques generally permit the communication system in which the techniques are implemented to achieve greater transmission capacity as contrasted to the capacity available with conventional analog communication techniques.

A communication system generally comprises a sending station and a receiving station communicating by way of one or more communication channels. Data to be communicated by the sending station to the receiving station is converted, if necessary, into a form to permit its transmission on the communication channel. A communication system can be defined by almost any combination of sending and receiving stations, including, for instance, circuit board-positioned sending and receiving elements as well as more conventionally-defined communication systems including users spaced at great distances apart communicating data between each other by transmission over radio channels.

When data transmitted on a communication channel is received at the receiving station, the receiving station acts upon, if necessary, the received data to recreate the informational content of the transmitted data. In an ideal communication system the data received at the receiving station is identical to the data transmitted by the sending station. However, in reality, much of the data may be distorted during its transmission on the communication channel. Such distortion distorts the data as received at the receiving station. If the distortion is significant, the informational content of portions of the data may not be recoverable.

A radio communication system is one example of a communication system utilized to transmit data between sending and receiving stations. In a radio communication system, the communication channel is formed of a radio communication channel. A radio communication channel may be defined within a portion of the electromagnetic spectrum. In a wireline communication system, in contrast, a physical connection between the sending and receiving stations is implemented to form the communication channel. Transmission of data upon a radio communication channel is particularly susceptible to distortion, due in part to the propagation characteristics of the radio communication channel. Data communicated on conventional wireline channels are also, however, susceptible to distortion in manners analogous to the manner by which distortion is introduced upon the data transmitted in a radio communication system.

In a communication system, which utilizes digital communication techniques, information, which is to be communicated, is digitized to form digital bits. The digital bits are typically formatted according to a formatting scheme. Groups of the digital bits, for example, are assembled to form a packet of data.

Orthogonal Frequency Division Multiplexing (OFDM) is a method that allows transmitting high data rates over extremely degraded channels at a comparable low complexity. In the classical terrestrial broadcasting scenario, in contrast to, for example, satellite communications where we have one single direct path from transmitter to receiver, we have to deal with a multipath-channel as the transmitted signal arrives at the receiver along various paths of different length. Since multiple versions of the signal interfere with each other (inter symbol interference (ISI)) it becomes very difficult to extract the original information. The common representation of the multipath channel is the channel impulse response (cir) of the channel, which is the signal received at the receiving station if a single pulse is transmitted from the transmitter.

If we assume a system transmitting discrete information in time intervals T, the critical measure concerning the multipath-channel is the delay Tm of the longest path with respect to the earliest path. A received symbol can theoretically be influenced by Tm/T previous symbols. This influence has to be estimated and compensated for in the receiver, a task that may become very challenging.

Multi-path transmission of the data upon a radio channel or other communication channel introduces distortion upon the data as the data is actually communicated to the receiving station by a multiple number of paths. The data detected at the receiving station, therefore, is the combination of signal values of data communicated upon a plurality of communication paths. Intersymbol interference and Rayleigh fading causes distortion of the data. Such distortion, if not compensated for, prevents the accurate recovery of the transmitted data.

Various methods are used to compensate for the distortion introduced in the data during its transmission upon a communication path.

The ability to obtain reliable channel estimates affects the system performance considerably. A common way of estimating the channel in TDMA (time division multiple access) is to transmit a training sequence and evaluate a Least square (LS) estimate of the channel at the receiver based on the knowledge of the training sequence. The LS channel estimate is basically a noisy version of the exact channel estimate. Hence, this technique relies on a law noise environment. Simulations show that for an uncoded system, a gap of about three dB at BER floor of 0.01 exists when using the LS channel estimate in comparison to using the exact channel estimate. This points to the advantages of using interpolation coefficients (with the least possible complexity) to enhance the LS channel estimate.

The correlation properties of the channel have been used to enhance the LS estimate. For example in the paper authored by J. J. Vands Beek, O. Edfors, M. Sandell, S. K. Wilson, and P. O. Borjeson, "On Channel Estimation in OFDM systems," in proc. $45^{th}$ *IEEE on Vehicular Technology Conference,* IL, July 1995, pp. 815–819, time correlation is used for channel estimate enhancement. A time interpolator relies on the correlation between different channel taps in the time domain, which requires the knowledge of the channel statistics versus time. The technique requires calculating the interpolator for every transmission burst. The interpolator requires a matrix inversion of dimension N (the size of the training sequence) for every burst which increases the system complexity.

In the paper authored by J. J. Vande Beek, O. Edfors, M. Sandell, S. K. Wilson, and P. O, Borieson, "OFDM Channel Estimation with Singular Value Decomposition," in proc. 46th *IEEE on Vehicular Technology Conference,* Atlanta, Ga., April 1996, pp. 923–927, interpolation in the frequency domain is used to enhance the LS estimate. This technique suffers from increased complexity due to the requirement of a matrix inversion. This technique was modified to include low rank approximation in the interpolator to decrease complexity, however, the modified technique requires estimation of a group of dominant eigenvalues and eigenvectors for every transmission burst. Since performing such eigen-decomposition is a complex task, the modified technique suffers from complexity as well.

In the paper authored by Y. Li, L. J. Cimini, Jr. and N. R. Sollenberger, "Robust Channel Estimation for OFDM Systems with Rapid Dispersive Fading Channels," *IEEE Trans. On Communications,* vol. 46, No. 7, July 1998, both the time and frequency channel statistics are used for interpolation. While reliance on both statistics enhances the channel estimate, it requires the knowledge of both time and frequency statistics for every transmission burst. In addition, calculations must be performed by the interpolator for every burst. Determining the channel statistics, every burst is also a very difficult task. This technique also requires additional processing capacity at the receiver to estimate the channel statistics from the received signal. This in turn increases the complexity of the receiver.

In the paper authored by Y. Li, N. Seshadri and S. Ariyavisitakul, "Channel Estimation for OFDM Systems with Transmitter Diversity in Mobile Wireless Channels," *IEEE JSAC, vol.* 17, No. 3, March 1999, a channel estimate for space time coding (STC) was introduced that basically evaluates the LS estimate of the channel in the time domain without doing any interpolation to avoid relying on the channel statistics. While the LS estimate alone without interpolation suffers from noise, in the presence of more than one transmitting antenna, it will also suffer from interference.

In the paper authored by S. K. Wilson, R. E. Khayata and J. M. Cioffi, "16 QAM Modulation with Orthogonal Frequency Division Multiplexing in a Rayleigh-Fading Environment," in proc. *VTC*-1994, pp. 1660–1664, Stockholm, Sweden, June 1994, a different approach for fast fading channels was introduced. This approach relies on adaptive interpolation. Use of this adaptive algorithm incurs problems related to algorithm convergence, i.e., the eigenvalue spread of the received data.

Such impairments as described above hinder the implementation of the LS channel estimator in real time applications.

SUMMARY

The invention presents a method and apparatus for estimating channels in orthogonal frequency division multiplexed (OFDM) communication systems. The method and apparatus allows a channel estimate to be determined independent of having knowledge on channel statistics. The method and apparatus may be implemented in OFDM systems having single or multiple transmitting antennas.

In an embodiment of the invention, the method and apparatus is implemented in an OFDM system utilizing at least two antennas. Channel estimation is performed by determining and then utilizing a least square (LS) estimate and an interpolation coefficient for each transmitting antenna. According to the embodiment of the invention, the interpolation coefficient is determined independently from the statistics of the channel, i.e., without needing the channel multipath power profile (CMPP). The interpolation coefficient is determined by estimating the maximum delay encountered by the channel, calculating a maximum number of multipaths L by dividing the maximum delay by the transmitted symbol duration, creating a channel multipath power profile for the receiver using L, and performing a fast fourier transform (FFT) on the multipath power profile to generate a frequency correction vector which is used to determine an interpolator coefficient in the form of an interpolator matrix M. The interpolator matrix M is then multiplied by an LS estimate for each transmitting antenna to determine the channel estimate for each channel.

The method and apparatus provides a channel estimate, which is very close to the exact channel. Moreover, it can be readily applied to different communication systems such as MIMO (Multi Input Multi Output), SIMO (Single-Input Multi-Output), MISO (Multi-Input Single-Output) and (Single-Input Single-Output). The method and apparatus does not rely on knowledge of the channel statistics (either in time or frequency) to enhance the LS estimate, and does not require such information. The interpolator is implemented mathematically by multiplying the LS estimate by the matrix M.

The matrix M is required to be estimated once, hence, the technique does not require estimating M every burst and does not include any mathematical operation except multiplication. Consequently, the approach has a very limited complexity, and therefore, can be easily implemented.

DETAILED DESCRIPTION

In the following description, particular embodiments of the invention are shown and described. A person skilled in the art will recognize that certain modifications may be made therein without departing from the scope and spirit of the invention as set forth and claimed.

Figure 1:
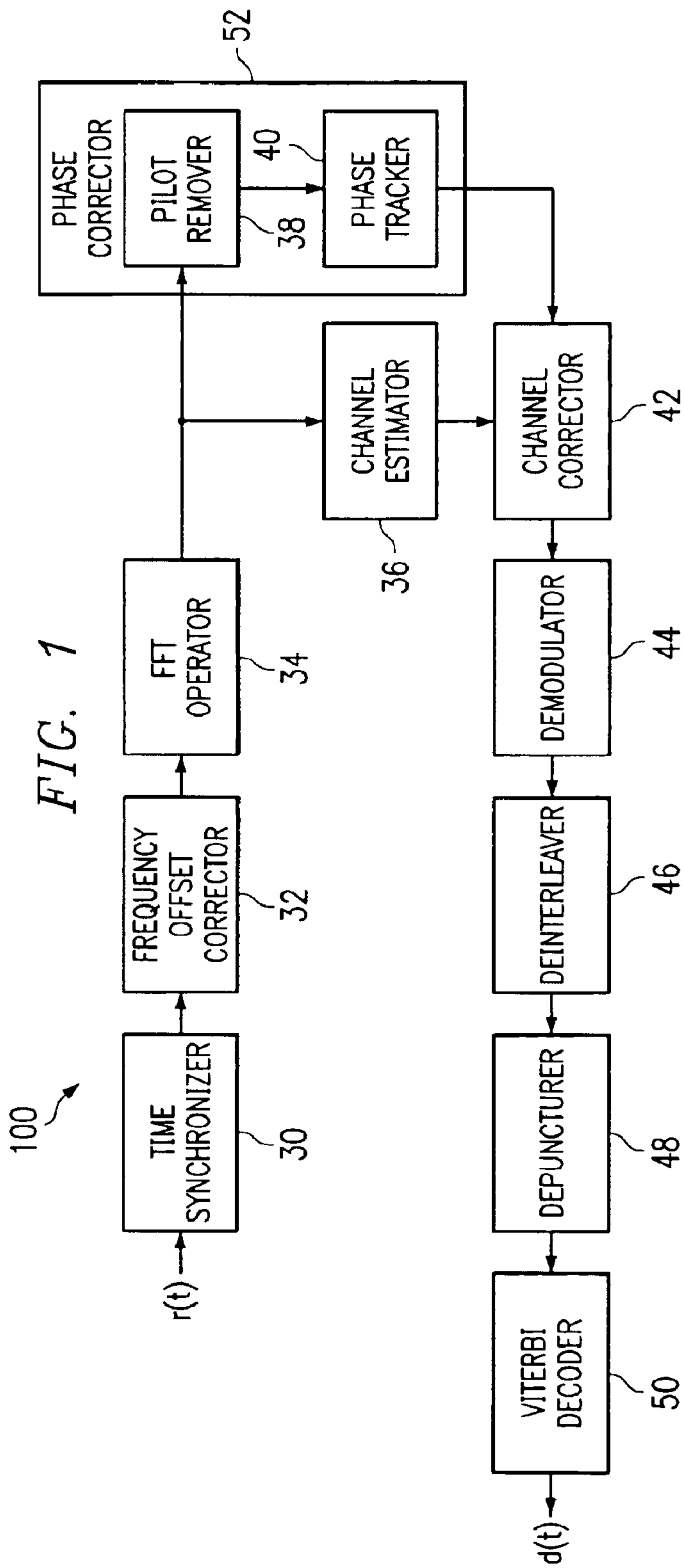
FIG. 1 illustrates portions of a receiver according to an embodiment of the invention.

Referring now to FIG. 1, therein is a functional block diagram illustrating portions of an orthogonal frequency division multiplexing (OFDM) receiver 100 according to an embodiment of the invention. Receiver 100 includes time synchronizer 30, frequency offset corrector 32, fast fourier transform (FFT) operator 34, channel estimator 36, channel corrector 42, demodulator 44, deinterleaver 46, depuncturer 48, Viterbi decoder 50, and phase corrector 52. Phase corrector 52 includes pilot remover 38 and phase tracker 40.

According to FIG. 1, a signal r(t), received over a radio channel, is input to time synchronizer 30. Time synchronizer 30 synchronizes the signal to the beginning of a transmission burst or block. Frequency offset corrector 32 then corrects the signal for any offset errors that occur between the transmitter local oscillator and the local oscillator of receiver 100. The corrected signal is then input to FFT operator 34 and converted from the time domain to the frequency domain. The frequency domain signal is then input to phase corrector 52, which comprises pilot remover 35 and phase tracker 40. Phase correctors 52 provide an estimate of the phase to channel corrector 42. Channel estimator 36 also receives the frequency domain signal and provides an estimate of the gain that the channel has incurred to channel corrector 42, which provides the corrected signal to demodulator 44.

Demodulator 44, deinterleaver 46, depuncturer 48, and Viterbi decoder 50, together form the decoder function in receiver 100.

Figure 2:
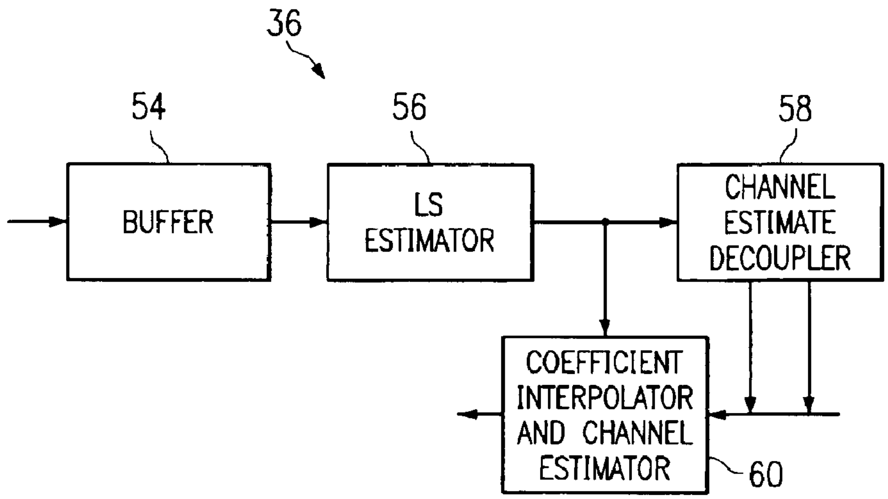
FIG. 2 illustrates portions of a channel estimator according to an embodiment of the invention.

Referring now to FIG. 2, therein are illustrated portions of channel estimator 36 of FIG. 1. Buffer 54 receives the frequency domain signal from FFT operator 34 and stores a training sequence from the frequency domain signal. A least squares (LS) channel estimate is then determined by performing division on the training sequence in LS estimator 56. Channel estimate decoupler 58 then decouples the LS channel estimate for each channel received over a separate antenna if more than one trasmitting antenna is being used, i.e., over each of a plurality of antennas. Coefficient interpolator and channel estimator 60 then receives each decoupled LS channel estimate from decoupler 58. Coefficient interpolator and channel estimator then multiplies interpolation coefficient for each channel by the LS estimator to obtain final channel estimates.

To describe the functions of channel estimator 36 in the embodiment of FIG. 1, the case of two transmitting antennas may be used as an example. The embodiment however, may be implemented for any number N of transmitting antennas.

An OFDM transmitter having two transmitting antennas (Tx1, Tx2) transmitting to receiver 100, with receiver 100 having one receiving antenna (Rx), for a down link transmission (the general case of M transmitting antennas is straightforward) will be used in this example. Each transmitting antenna Tx1, Tx2 of the transmitter may use a long training sequence of length N. The training sequences of Tx1 and Tx2 may be represented by [A,B] and [C,D] respectively, and chosen to be related as follows:

$$B=A$$

$$C=Ae^{j\pi/2}$$

$$D=Ae^{-j\pi/2} \quad [1]$$

Any number and choice of training sequences may be used. This description is generalized to any number and choice of the training sequences.

The received signals for the two training sequences input to LS estimator 56 can be expressed as, $$z_1=Q_Ah_1+jQ_Ah_2+n_1, \quad [2]$$

$$z_2=Q_Ah_1-jQ_Ah_2+n_2, \quad [3]$$

Where $Q_A$ is assumed to be the diagonal N×N matrix whose entries are the elements of A, $h_1$ is assumed to be the N×1 channel response for the $i^{th}$ ($i\in\{1,2\}$) transmitting antenna, $n_i$ is assumed to be the N×1 noise vector associated with the $i^{th}$ ($i\in\{1,2\}$) received training sequence, and has a variance $\sigma^2$.

The least squares (LS) estimate for Tx1 and Tx2, respectively, output from channel estimator 58 $h_1$ and $h_2$ would be given by:

$$h_{1,ls}=0.5Q_A(z_1+z_2)=h_1+\frac{(n_1+n_1)}{2}=h_1+v_1 \quad [4]$$

$$h_{2,ls}=0.5Q_A(jz_2-jz_1)=h_2+\frac{(n_1-n_1)}{2}=h_2+v_2 \quad [5]$$

Where $v_1$ and $v_2$ would be the new noise vectors with variance $$\frac{\sigma^2}{2}.$$

From [4] and [5], the LS estimate may be obtained by dividing the received training sequences with the actual ones. It can be also noted from [4] and [5] that the LS channel estimate is a noisy version of the exact one (i.e. the LS channel estimate is the exact channel response plus noise).

According to the embodiment, the channel is estimated by coefficient interpolator and channel estimator 60 using a MMSE based filter to enhance the LS channel estimates represented by [4] and [5]. This mitigates the effect of the noise vectors in equation [4] and [5] by decreasing the noise energy (variance). This is done by combining the LS channel estimates received from channel estimate decoupler 58 with suitable interpolating coefficients that are determined in coefficient interpolator and channel estimator 60. Mathematically, this is manifested by multiplying the LS channel estimate represented by equations [4] and [5] with an interpolating matrix M, $$\hat{h}_i=M\cdot h_{i,ls}i=1,2 \quad [6]$$

The MMSE interpolator coefficient M is based on the well-known MMSE criteria.

$R_{x,y}=E[xy^H]$ and $x^H$ would be the conjugate transpose of x.

In particular, the filter M minimizes the average error between the interpolated LS channel estimate $\hat{h}_i$ and the exact channel response $h_i$. This has the effect of preserving the useful term in equations [4] and [5] (i.e. $h_i$) while minimizing the noise term (i.e. $v_I$). Ideally, the MMSE filter M may be written as $$M=R\cdot(R+R_{v_1,v_1})^{-1}=R\cdot\left(R+\frac{\sigma^2}{2}I\right)^{-1} \quad [7]$$

Where in equation [7], it is assumed that channel responses corresponding to antennas Tx1 and Tx2 have the same correlation function R or equivalently the same Channel Multipath Power Profile (CMPP).

The rank of R is almost equal to the number of non-zero taps in the CMPP, which is usually less than the overall dimension N, and-the entries of R represent the correlation between the different components of $h_i$, i=1,2, the more correlation between carriers we have, the more enhancements we expect from the interpolator. In a typical OFDM system there is a correlation coefficient of about 0.9 between each two adjacent carriers.

The following algorithm can be used to interpolate the channel if the channel statistics manifested in CMPP is known:

Input: $h_{i,ls}$, i=1,2.

Output: $\hat{h}_i$, i=1,2.

Algorithm:

For a particular radio channel knowing CMPP, find R=Toeplitz[FFT(CMPP)].

Knowing the noise variance, substitute in [7] to get M. Substitute in equation [6] to get $\hat{h}_i$, i=1,2.

It is to be noted that the CMPP is not available at the receiver. Hence, the above algorithm is replaced by an algorithm according to the method and apparatus of the invention.

It appears clear from the analysis of [7] that the interpolator depends on the channel correlation function R. R is the Toeplitz matrix built from the FFT of the CMPP, consequently the solution will depend on the channel multipath power profile (i.e. CMPP).

The embodiment of the invention provides an approach that almost does the same job as the exact MMSE interpolator without depending on the knowledge of CMPP (or equivalent the channel statistics) at the receiver. According to the embodiment, the above algorithm is replaced by an algorithm that may be performed independent of knowledge of the CMPP. The following Lemma may be used to describe the method and apparatus.

Lemma

If $\hat{H}_i$=IDFT($\hat{h}_i$), i=1,2, $H_{i,ls}$=IDFT($h_{i,ls}$), i=1,2, a is the vector constructing the teoplitz matrix R (the first column in R) and $\phi_r(k)=(\text{IDFT}(a))_k$, k=1,2, . . . , N then equation [6] corresponds in the time domain to $$\hat{H}_i = \Psi \cdot H_{i,ls} \qquad [8]$$

Where $$\Psi = \begin{bmatrix} \Psi(1) & 0 & \cdots & 0 \\ 0 & \Psi(2) & \cdots & 0 \\ \vdots & \vdots & \ddots & \vdots \\ 0 & 0 & \cdots & \Psi(N) \end{bmatrix} \text{ and}$$

$$\psi\Psi(k) = \frac{\varphi\varphi_r(k)}{\varphi\varphi_r(k) + \frac{\sigma^2}{2}},\ k = 1, 2, \ldots,\ N.$$

Proof

The expression in [8] can be proved by recalling from [4] and [5] that, $$h_{i,ls} = h_i + v_i,\ i=1,2 \qquad [11]$$

Applying the IDFT operator to [11] we get, $$H_{i,ls} = H_i + V_i,\ i=1,2 \qquad [12]$$

where $H_i$=IDFT($h_i$), i=1,2 and due to the orthogonality of the IDFT operator, the new noise components are also independently identically distributed (iid) but with a covariance matrix $$\frac{\sigma^2}{2} I.$$

Solving for the MMSE filter F that estimates $H_i$ from $H_{i,ls}$ in equation [12], we get, $$F = R_{H_i,H_{i,ls}} \cdot R^{-1}_{H_{i,ls}H_{i,ls}} \qquad [13]$$

$$\text{where } R_{H_{i,ls}H_{i,ls}} = R_{H_i,H_i} + \frac{\sigma^2}{2} I,\ R_{H_i,H_{i,ls}} = R_{H_i,H_i} \text{ and}$$

-continued $$R_{H_i,H_i} = \begin{bmatrix} \varphi_r(1) & 0 & \cdots & 0 \\ 0 & \varphi_r(2) & \cdots & 0 \\ \vdots & \vdots & \ddots & \vdots \\ 0 & 0 & \cdots & \varphi_r(N) \end{bmatrix} \qquad [14]$$

The expression of $R_{Hi.Hi}$ results from the fact that the channel coefficients are uncorrected for different paths, hence the off-diagonal entries in $R_{Hi.Hi}$ vanish or equivalently, $R_{Hi.Hi}$ is a diagonal matrix. The diagonal entries represent the power in each path, i.e. the components of the CMPP. Substituting equation [14] in equation [13], then equation [8] follows.

Equation [8] indicates that the function of the interpolator is equivalent in the time domain to scaling the $k^{th}$ component of the LS channel estimate for each transmitting antenna with Ψ(k). The person skilled in the art will recognize that the number of multipaths in the channel is usually much less than the number of carriers N. Hence, only few taps of the LS channel estimate in the time domain are carrying useful energy while, the rest are only noise. Stated differently, referring to equation [12], the useful term in equation [12], $H_i$, has few nonzero entries while the entries of the noise term $V_i$ are all nonzero. Since Ψ(k) and $H_i$ have nonzero entries at the same positions, scaling the $k^{th}$ component of the LS channel estimate with Ψ(k) basically preserves the useful part in equation [12] (i.e. $H_i$) and eliminates a major portion of the noise part (i.e. $V_i$). Based on this, it can be noted that:

Since the value of the non-zero Ψ(k) in equation [8] is close to one (even at very low SNR value as $$\frac{\sigma^2}{2} << \varphi_r(k)),$$

then the exact value of the multipath profile used at the receiver is irrelevant and what really matters is the positions of these taps. In other words, we can achieve almost the same performance if the receiver used a Receiver Multipath Power Profile (RMPP) that differs from the channel one (CMPP) as long as it does not miss a tap in CMPP (i.e. as long as there is no zero entry in RMFPP which corresponds to a nonzero entry in CMPP).

f the receiver misses a tap that exists in the channel than it is scaling some received path by a zero value or equivalently eliminating some of the received energy. It is to be expected that such a scenario would deteriorate the interpolator performance.

If the receiver does not miss a tap in the channel, however, it adds more taps than those really exists, it is basically collecting noise at these taps. Simulations show that the influence of picking up such noise is not significant since $L_{ch}$<<N.

The maximum number of channel taps $L_{ch}$ that can exist is so well defined, i.e. the ratio between the channel multipath spread Tm and the symbol duration T. Thus, a scenario that achieves most of the interpolator performance with much less complexity is to fix a multipath power profile at the receiver that basically includes a number of taps equal to $L_{ch}$. In such case, the RMPP will never miss a tap that is in CMPP.

Based on the knowledge of $L_{ch}$, the coefficient interpolator and channel estimator 60 will use a RMPP covering all the expected taps in CMPP. The values of the interpolation coefficients can then be determined (based on only knowing $L_{ch}$). The coefficient interpolator and channel estimator 60 then would use these coefficients to interpolate the LS channel estimate. It is to be noted again that the same coefficients are to be used every burst, so the coefficient interpolator and channel estimator 60 need not to calculate $\hat{M}$ (and hence find the inverse of N×N matrix) every burst.

According to the embodiment, when a RMPP that consists of $L_{ch}$ taps is chosen with any power values. $\hat{R}$=FFT(RMPP) is then used in the algorithm instead of R.

Figure 3:
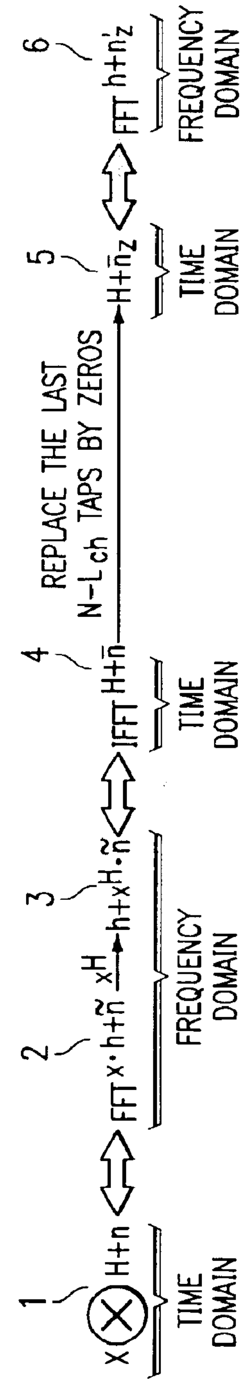
FIG. 3 illustrates process steps performed when applying interpolation according to an embodiment of the invention.

Referring now to FIG. 3, therein are illustrated the process steps when calculating interpolation coefficients according to an embodiment of the invention. A received time signal consisting of the training signal is convoluted with the channel plus White Gaussian Noise (WGN) (1). The time signal is then converted to the frequency domain via FFT operation (2) in FFT operator 34. The LS estimator 56 multiplies the received signal in the frequency domain by the conjugate of the training sequence (3) to result in a noisy version of the channel response. Coefficient interpolator and channel estimator 60 takes the LS estimate in the time domain (4). Due to scaling performed according to equation [8], the coefficient interpolator and channel estimator 60 scales the first $L_{ch}$ components using ones and it replaces the last N-$L_{ch}$ components by zeros (5). This process has the effect of suppressing a lot ofnoise components while not affecting all the channel components since the channel can only exist at some positions in the first $L_{ch}$ components. The new (less-noisy) estimate is then transformed to the frequency domain (6). Consequently, the interpolator acts as a low-pass filter but in the time domain.

Figure 4:
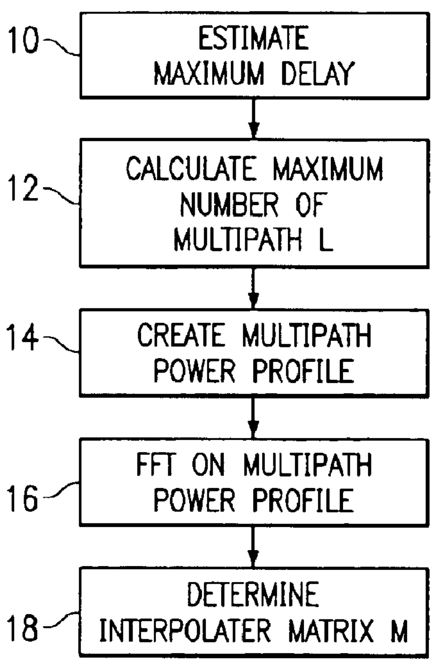
FIG. 4 is a flow chart illustrating process steps performed when calculating interpolation coefficients according to an embodiment of the invention.

Referring now to FIG. 4, therein is a flow chart illustrating process steps when calculating the interpolation coefficient according to an embodiment of the invention. As already mentioned, it will not be necessary that a calculation be performed every burst but instead it can be done once as long as the channel multipath spread Tm is constant. The multipath spread Tm for those channels is pre-known to the designer usually from intensive measurements that had been done on such channels. Hence, the requirement of knowing Tm adds no burden to the receiver complexity.

In block (10) an estimate of the maximum delay encountered by the channel is performed. From block (10) the maximum number of multipaths L can be calculated by dividing the maximum delay encountered by the channel Tm by the symbol duration T (12). In block (14), a receiver multipath power profile is created. Next, in block (16) by performing an FFT operation on the receiver multipath power profile, the frequency correlation vector is found. Next, in block (18), the interpolator matrix M is calculated by constructing the teoplitz of $\psi$.

Figure 5:
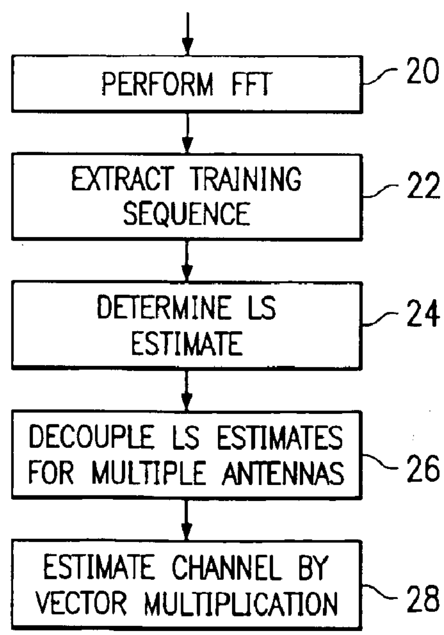
FIG. 5 is a flow chart illustrating process steps performed when applying interpolation to estimate a channel according to an embodiment of the invention.

If M is multiplied by the least square channel matrix obtained by the process described in FIG. 5 the final estimate of the channel is obtained.

Referring now to FIG. 5, therein is a flow chart illustrating process steps when applying interpolation according to an embodiment of the invention. The process described in FIG. 6 is a burst by burst process to obtain the least square channel estimate. The received signal r(t) is put into the frequency domain by the FFT operation (20) and the training sequence is extracted from the preamble of the burst (22). A least square channel estimate is obtained by dividing the received training sequence by the exact training sequence (24). Block (26) exists only in the case of multiple antennas case and comprises the step of decoupling the different channels corresponding to the different transmitting antennas.

In block (28) a complex matrix-vector multiplication is performed, by multiplying the least square channel estimates and the interpolating coefficients to estimate each channel.

Thereby, a manner is provided by which to communicate data on a channel susceptible to distortion. When utilized, an improved and simplified communication method of communications is permitted. The preferred descriptions are of preferred examples for implementing the invention, and the scope of the invention should not necessarily be limited by this description.

What is claimed is:

1. A method for estimating a channel formed of multipaths, the method comprising the steps of:

calculating a least square channel estimate based on a training sequence;

calculating an interpolation coefficient matrix, wherein said interpolation coefficient matrix is calculated independent of knowledae of a channel multipath power profile of the channel, the multipath power profile created responsive to calculations of a maximum number of multipaths of the channel responsive to an estimated maximum delay encountered upon the channel; and estimating the channel based on said interpolation coefficient matrix and said least square channel estimate.

2. The method of claim 1, wherein the step of calculating an interpolation coefficient matrix comprises the step of calculating the maximum number of resolvable multiple paths on the channel.

3. The method of claim 2, wherein the step of calculating an interpolation coefficient matrix further comprises the step of performing a fast fourier transform on said multipath power profile.

4. The method in claim 3, wherein the step of calculating an interpolation coefficient matrix further comprises the step of constructing a teoplitz of the result of the step of performing a fast fourier transform.

5. The method in claim 4, wherein the step of calculating an interpolation coefficient matrix further comprises multiplying said interpolation matrix by said least square channel estimate.

6. An apparatus for estimating a channel, the apparatus comprising:

an LS estimator for calculating a least square channel estimate based on a training sequence;

a coefficient interpolator coupled to said LS estimator, said coefficient interpolator for calculating an interpolation coefficient matrix for the channel, wherein said interpolation coefficient matrix is calculated independent of knowledge of a channel multipath power profile of the channel, the multipath power profile created responsive to calculations of a maximum number of multipaths of the channel responsive to an estimated maximum delay encountered upon the channel; and a channel estimator coupled to said coefficient interpolator and to said LS estimator, said channel estimator for estimating the channel based on said interpolation coefficient matrix, formed independent of the channel multipath power profile, and said least square channel estimate calculated by said LS estimator, the channel estimated.

7. The apparatus of claim 6 wherein said coefficient interpolator further calculates the maximum number of resolvable paths on the channel for use in calculating, said interpolation coefficient matrix.

8. The apparatus of claim 7, wherein said coefficient interpolator further performs a fast fourier transform on said multipath power profile to generate a result for use in calculating said interpolation coefficient matrix.

9. The apparatus of claim 8, wherein said coefficient interpolator further constructs a teoplitz matrix of the result of said fast fourier transform to generate the interpolation coefficient matrix.

10. The apparatus of claim 9, wherein said coefficient interpolator further multiplies said interpolation coefficient matrix by said least square estimate calculated in said LS estimator to estimate the channel.

11. A method for estimating at least one channel at an OFDM receiver that receives a signal formed of symbols, each of a selected symbol duration, upon the at least one channel formed of multipaths, said method comprising the steps of:

estimating a maximum delay encountered upon the channel;

calculating a maximum number of the multipaths of the channel responsive to the maximum delay estimated during said step of estimating;

creating a multipath power profile responsive to calculations made during said step of calculating the maximum number;

transforming the multipath power profile into a frequency domain; and calculating an interpolator coefficient responsive to the multipath power profile represented in the frequency domain.

12. The method of claim 11, further comprising the steps of:

calculating a least square channel estimate for each channel of the at least one channel; and multiplying each least squares channel estimate for each channel of the at least one channel by said interpolation coefficient to estimate each at least one channel.

13. An OFDM apparatus at an OFDM receiver that receives a signal formed of symbols, each of a selected symbol duration, upon a channel of multipaths, said OFDM apparatus comprising:

means for estimating a maximum delay encountered upon the channel;

means for calculating a maximum number of the multipaths of the channel responsive to the maximum delay estimated by said means for estimating;

means for creating a multipath power profile responsive to calculations made by said means for calculating;

means for transforming the multipath power profile created by said means for creating into a frequency domain; and means for calculating an interpolator coefficient responsive to the multipath power profile represented in the frequency domain.

14. The apparatus in 13, further comprising:

a buffer for storing a training sequence;

means for calculating a least square channel estimate from said stored training sequence; and means for combining said least square channel estimate with said interpolator coefficient.

* * * * *